United States Patent

Kieffer et al.

[11] Patent Number: 5,594,984
[45] Date of Patent: Jan. 21, 1997

[54] GAPLESS INNER DIAMETER STATOR WINDING BLOCKING MECHANISM

[75] Inventors: Vernon E. Kieffer, St. Louis; Andrew J. Kliethermes, Franklin County, both of Mo.

[73] Assignee: Emerson Electric Co., St. Louis, Mo.

[21] Appl. No.: 485,233

[22] Filed: Jun. 6, 1995

Related U.S. Application Data

[63] Continuation of Ser. No. 106,399, Aug. 12, 1993, Pat. No. 5,491,886.

[51] Int. Cl.⁶ .................................................. H02K 15/06
[52] U.S. Cl. .............................. 29/736; 29/596; 29/734; 242/432.6
[58] Field of Search ........................ 29/596, 732, 734, 29/735, 736, 564.5; 310/214, 215; 242/1.1 R, 1.1 E, 432.6

[56] References Cited

U.S. PATENT DOCUMENTS

| | | | |
|---|---|---|---|
| 3,464,639 | 9/1969 | Harelson et al. | 242/432.6 |
| 3,874,056 | 4/1975 | Peters | 29/736 X |
| 4,003,116 | 1/1977 | Bale | 29/734 |
| 4,047,293 | 9/1977 | Kieffer | 29/736 |
| 4,617,972 | 10/1986 | Walker | 29/596 X |
| 4,710,664 | 12/1987 | Cox et al. | 310/217 |
| 5,056,212 | 10/1991 | Scherer | 29/564.5 |
| 5,090,107 | 2/1992 | Beakes et al. | 29/596 X |
| 5,237,740 | 8/1993 | Hayashi et al. | 29/734 |

FOREIGN PATENT DOCUMENTS

| | | | |
|---|---|---|---|
| 2441292 | 4/1975 | Germany | 29/736 |
| 2407577 | 7/1975 | Germany | 29/736 |

*Primary Examiner*—Peter Vo
*Attorney, Agent, or Firm*—Polster, Lieder, Woodruff & Lucchesi

[57] ABSTRACT

An inner diameter block for blocking the inner diameter of windings of an electric motor includes a plurality of first segments and a plurality of second segments arranged in an alternating manner. The segments are movable radially outwardly to block the inner diameter of the windings. One of the segments is generally pie shaped, having an arcuate outer surface and ears extending circumferentially to define part of the outer surface. These first segments define gaps which receive second segments. The first and second segments have sloping inner surfaces which define a core in which an expanding cone is received. The cone, when moved axially in the core, urges the second segments radially outwardly. The second segments then force the first segments radially outwardly. The interaction of the second segments with the ears of the first segments provide a substantially continuous, gap-free outer surface to the inner diameter block at all stages of expansion.

11 Claims, 5 Drawing Sheets

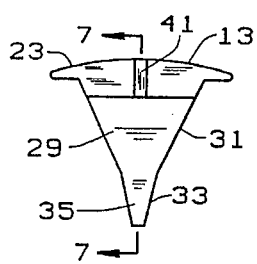
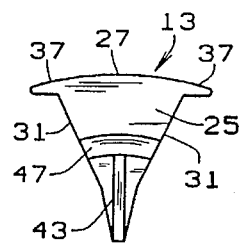
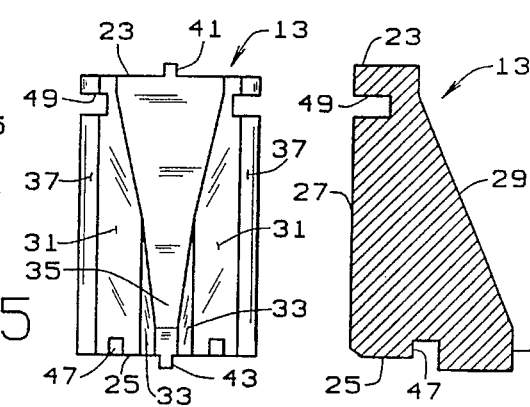
FIG. 4  FIG. 5  FIG. 6  FIG. 7
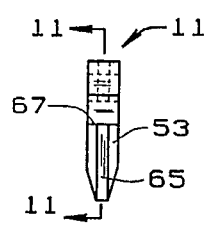
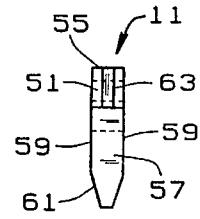
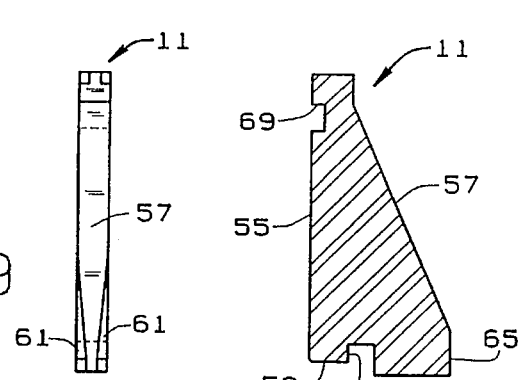
FIG. 8  FIG. 9  FIG. 10  FIG. 11
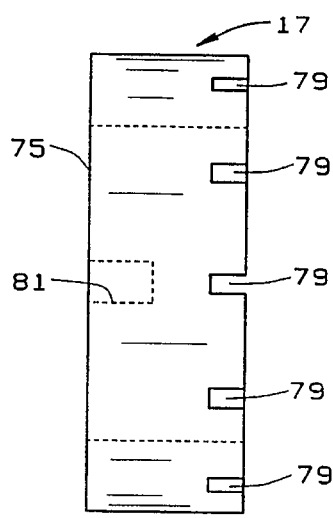
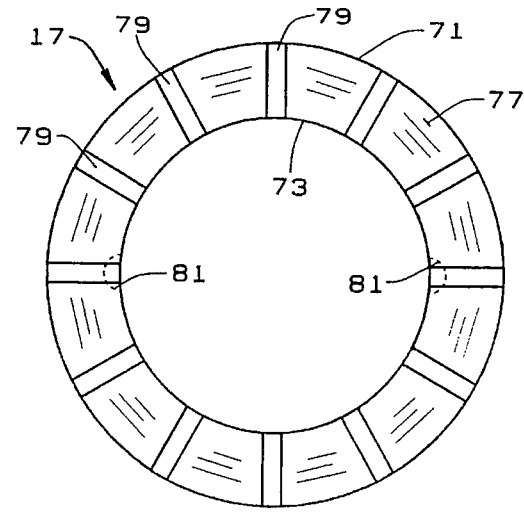
FIG. 12  FIG. 13

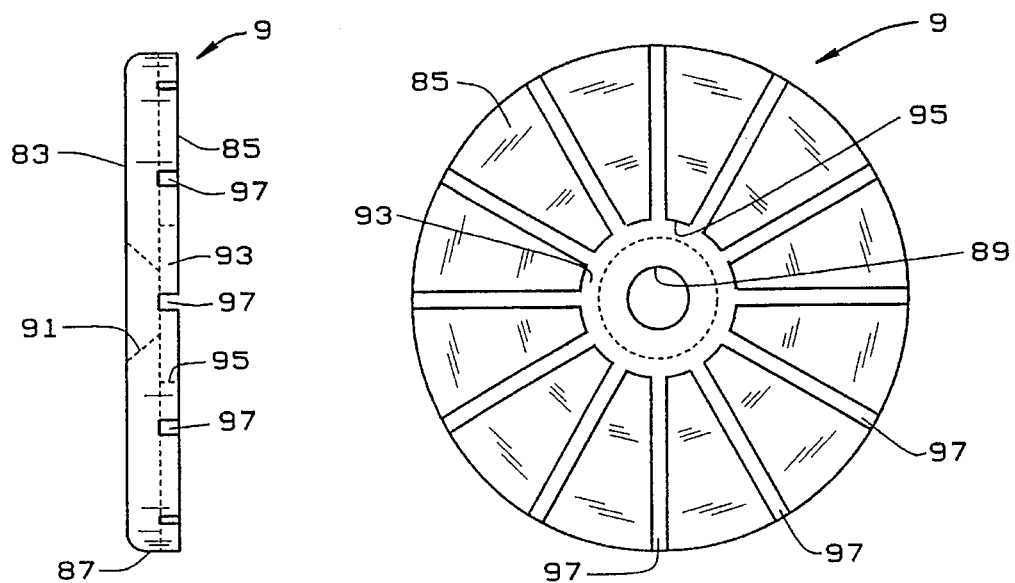
FIG. 14   FIG. 15
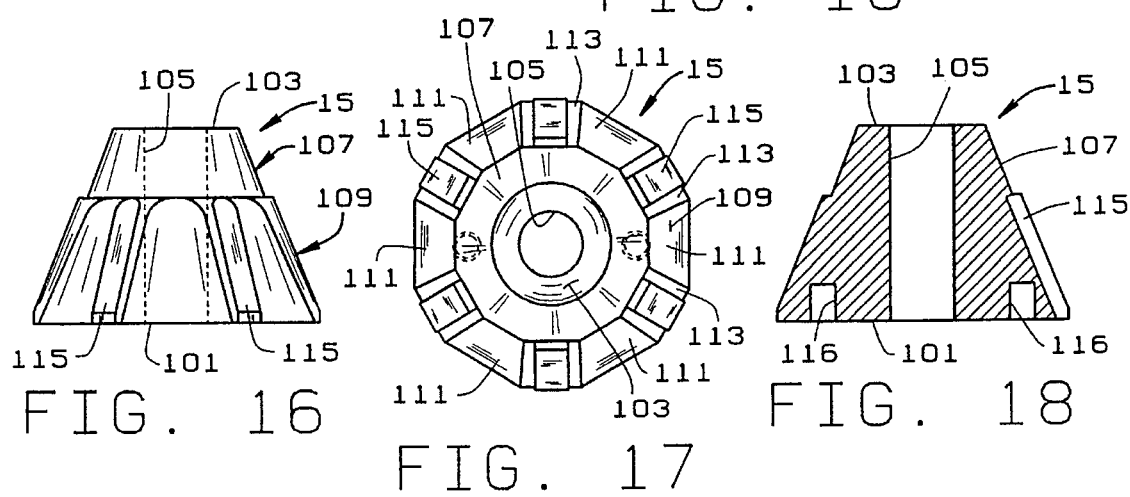
FIG. 16   FIG. 17   FIG. 18
FIG. 19

GAPLESS INNER DIAMETER STATOR WINDING BLOCKING MECHANISM

This is a continuation of application Ser. No. 08/106,399, filed on Aug. 12, 1993 now U.S. Pat. No. 5,491,886.

BACKGROUND OF THE INVENTION

This invention relates to the blocking of motor stator windings, and, in particular, to the blocking of the inner diameter of the windings.

When windings are inserted into the winding receiving slots of a stator assembly for a motor, for example, the end turn portions of the windings are not in proper or acceptable form. Commonly, the end turns must be blocked to have an inner diameter, an outer diameter, and a height which meets with certain industrial standards and specifications. The windings are typically blocked by a mechanism having tooling which sequentially blocks the outer diameter, the inner diameter and the height of the winding end turns.

The stator winding blocking devices conventionally include three tooling parts, an outer diameter block, an inner diameter block, and a compression ring which blocks the height of the windings. The outer diameter block is made of discrete segments which form a continuous ring in the block condition. The inner diameter block is made of discrete segments and forms a contiguous circle prior to blocking, as is shown in FIG. 1A of the drawings, labeled prior art. To block the windings, the outer diameter is initially blocked by compressing the outer diameter block. The outer diameter block segments are arranged around the windings and moved radially inwardly to bring all stray winding coils inside the predetermined radius. When the outer diameter block is in its block position, the coils are presented with a contiguous circular surface.

The inner diameter is blocked next. The inner diameter block segments are arranged inside of the coils and moved radially outwardly until a predetermined inner diameter of the windings is reached. Because the inner diameter block segments are separated, the windings are presented with a discontinuous circular surface which define gaps G, shown in FIG. 1B of the drawings.

Lastly, the windings are blocked for height using the compression ring. When the windings are compressed, the coils or winding end turn portions "squirt" or move into the gaps G of the inner diameter block. Therefore, to insure that these "squirted" windings are within the proper inner diameter tolerances, the inner diameter block has to block the windings more severly than would be necessary if this "squirting" had not occurred. The extra blocking, which is made necessary because of the required blocking dimension imposed on the motor and the likelihood of wire "squirts", can damage the windings. The winding damage, in turn, eventually results in motor failure.

Applicants are unaware of any commercially available inner diameter blocking tooling which presents the windings with a substantially continuous gap-free surface when blocked.

SUMMARY OF THE INVENTION

One object of this invention is to provide a stator coil inner diameter tool block which substantially reduces "squirting" of the windings during blocking.

Another object is to provide such a tool block which will present the inner diameters of the winding with a substantially gapless surface when the windings are blocked.

Another object of this invention is to provide an economical tooling structure for providing a substantially gapless surface to the windings of a dynamoelectric machine during blocking operations.

Other objects will become apparent to those skilled in the art in view of the following disclosure and accompanying drawings.

Briefly stated, a blocking mechanism of the present invention includes an outer diameter block for blocking the outer diameter of the winding end turns, an inner diameter block for blocking the inner diameter of the winding end turns, and a compression ring for blocking the height of the winding end turns. The inner diameter block has a plurality of segments which are radially movable between a compressed position and an expanded, blocking position. The segments are sized, shaped, and arranged so that their outer surfaces define a substantially continuous, gap-free cylinder at all stages of expansion. The segments include a plurality of first segments and a plurality of second segments. The first and second segments are arranged in an alternating pattern in the tooling block mechanism.

The first segments have a top surface, a bottom surface, an outer surface, a sloping inner surface, generally radially extending side walls, and ears extending circumferentially from opposite sides thereof. The ears have an outer surface defining part of the first segment outer surface. The second segment has a top surface, a bottom surface, a radially outer surface, a sloping inner surface, and side walls. When the inner diameter block is in its compressed position, the ears of the first segments are substantially adjacent each other to define gaps between neighboring first segments. The second segments are sized and shaped to be received in the gaps formed between the first segments.

The inner surfaces of the first and second segments define an opening along the inner diameter block tooling having a generally sloped surface. An expanding cone is sized and shaped to be received in the inner diameter block opening. The expanding cone is movable axially along the opening to move the segments between their compressed and expanded positions. The cone includes an upper portion and a lower portion. The upper portion is in contact with the sloping surface of the second segments to urge the second segments radially outwardly when the cone is moved axially downwardly, referenced to FIG. 2, during operation of the device. The cone does not act directly on the first segments. Rather, the cone urges the second segments radially outwardly. The radially outer surface of the second segment is thus urged against the inner surface of the ears of the first segments. By urging against the ears, the second segments move the first segments radially outwardly. As the ears are separated, the outer surface of the second segments are exposed. When fully expanded, the outer surface of the first and second segments are radially even to define a substantially continuous, gap-free surface. Because there are substantially no gaps, "squirting" of the windings during compression is substantially reduced.

In one embodiment of the cone, its upper portion is faceted. Protrusions extend from alternate facets of the upper portion. The cone is positioned in the core so that the protrusions are in contact with the second segments to act against the second segments. In another embodiment, the cone's upper portion is separate from its lower portion. The lower portion has a pin fixed in an upper surface and the upper portion is journaled on the pin for axial movement toward and away from the lower portion. The upper portion is in contact with the second segments to urge them radially outwardly when the cone is move axially downwardly in the core.

The inner diameter block tooling also includes a top and bottom cover which define grooves. The segments have guides formed in their top and bottom surfaces which are received in the grooves to guide the segments in their radial movement. The segments also have grooves formed on their outer surfaces and their bottom surfaces. The grooves receive 0-rings which hold the block in its generally cylindrical configuration.

BRIEF DESCRIPTION OF THE DRAWINGS

FIG. 4 is a top plan view of a first expanding segment of the block;

FIG. 5 is a bottom plan view of the first expanding segment;

FIG. 6 is a front elevational view of the first expanding segment;

FIG. 7 is a cross sectional view of the first expanding segment;

FIG. 8 is a bottom plan view of a second expanding segment of the block;

FIG. 9 is a top plan view of the second expanding segment;

FIG. 10 is a front elevational view of the second expanding segment;

FIG. 11 is a cross-sectional view of the second expanding segment;

FIG. 12 is a side elevational view of a top cap of the block;

FIG. 13 is a bottom plan view of the top cap;

FIG. 14 is a side elevational view of a bottom cover of the blocking mechanism;

FIG. 15 is a bottom plan view of the bottom cover;

FIG. 16 is a side elevational view of an expanding cone of the block;

FIG. 17 is a bottom plan view of the cone;

FIG. 18 is a cross sectional view of the cone;

FIG. 19 is a cross sectional view of the blocking mechanism in a compressed position;

DESCRIPTION OF THE PREFERRED EMBODIMENT

Figure 2:
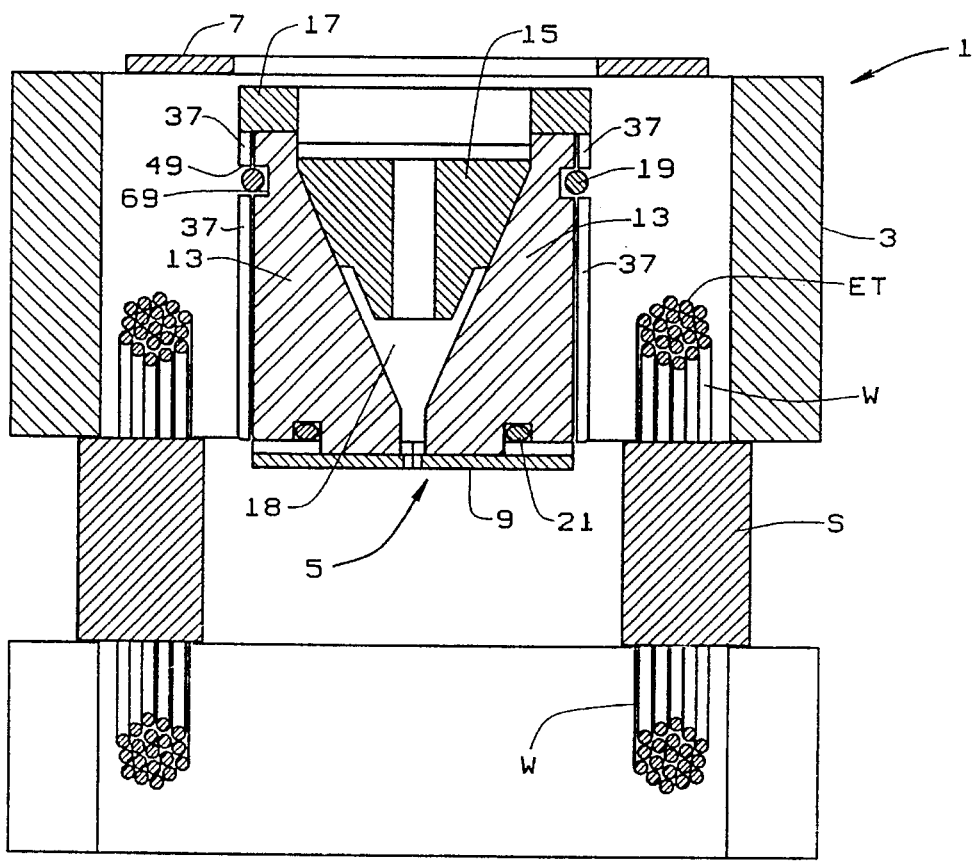
FIG. 2 is a cross-sectional view of a blocking mechanism of the present invention positioned in a stator core for blocking of the stator windings.
Figure 3:
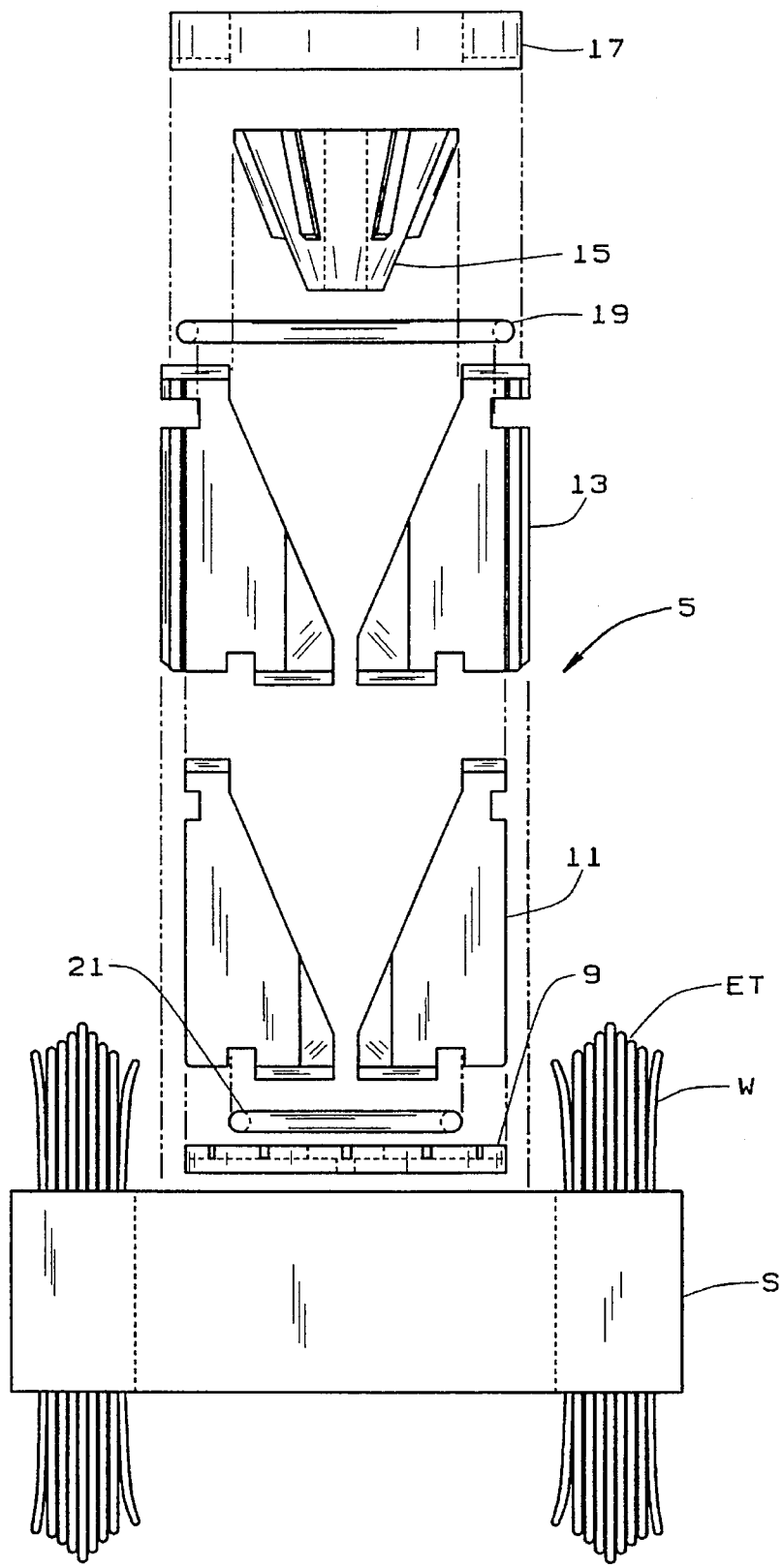
FIG. 3 is an exploded view an inner diameter block of the present invention.

One illustrative embodiment of blocking mechanism 1 of the present invention is shown in FIGS. 2 and 3 in position to block one end face side of the end turns ET of winding W of a stator assembly S. Blocking mechanism 1 includes an outer diameter block 3, an inner diameter block 5, and a compression ring 7. The outer diameter block and compression ring are conventional and do not form part of the invention. As is known, to block windings W, the outer diameter of block 3 defines an annular ring made out of a plurality of segments which are initially separated to define an expanded ring. The segments are brought radially inwardly to define a ring having a desired inner diameter equal to the desired outer diameter of the windings to block the outer diameter of the winding end turns. In the blocking position, the outer diameter ring 3 has an inner surface which is substantially continuous. The inner diameter block 5, which also is made up of a plurality-of segments, is expanded from its initial compressed position shown in FIG. 2 to an expanded position by moving the segments radially outwardly to define a ring or cylinder having an outer diameter equal to the desired inner diameter of the windings. As will be described below, the inner diameter block 5 of the present invention presents a substantially gap-free, continuous outer surface at all stages of expansion. The compression ring 7 is then brought downward to compress end turns of windings W to the desired height. Windings W include both upper and lower end turn portions. Thus, two blocking mechanisms 1 are required to fully block stator windings W. Only one blocking mechanism has been shown for clarity in FIG. 2.

Figure 22:
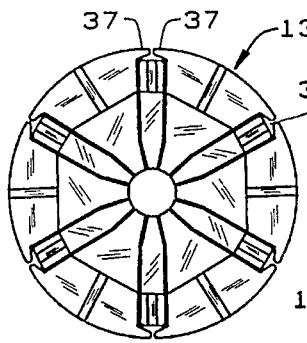
FIG. 22 is a bottom plan view of the block in a compressed position.

Turning to FIG. 3, the elements of the inner diameter tooling block 5 can be more clearly seen. Block 5 includes a bottom 9, a plurality of narrow expanding segments 11, a plurality of wide expanding segments 13, an expanding cone 15, and a cap 17. Cone 15 is received within a bore or opening 18 of block 5. As can be seen in FIGS. 20 and 22, segments 11 and 13 are alternated in the block when assembled. The segments are held together by a pair of o-rings 19 and 21.

The wider expanding segments 13 are shown more clearly in FIGS. 4–7. Segment 13 has a top surface 23, a bottom surface 25, an arcuate outer surface 27, and a sloping inner surface 29. Segments 13 are generally pie-shaped in plan, having radially extending side walls 31. Side walls 31 are angled, as at 33, to form narrow radially inner portions 35 of segment 13. Outer wall 27 is defined by the general arc of segment 13 and a pair of oppositely directed circumferentially extending ears 37. Ears 37 have an inner surface 38 which tapers so that ears 37 are wider at their roots than at their ends. As can be seen in FIGS. 20 and 22, when the block 5 is assembled, the ears of adjacent segments 13 space segments 13 apart to define a gap 39 therebetween.

A top guide 41 is formed in the top surface 23 and extends radially the full distance of top surface 43. A bottom guide 43 is formed in bottom surface 25 and extends radially inwardly along portion 35. Bottom surface 25 also defines a groove 47 which, when block 5 is assembled, receives bottom o-ring 21. Bottom guide 43, extends from the radially innermost end of portion 35 to the o-ring groove 47. An upper groove 49 is formed in outer surface 27 slightly below top surface 23 to receive o-ring 19.

The narrow expanding segment 11 is shown in more detail in FIGS. 8–11. Segment 11 has a top surface 51, a bottom surface 53, a radial outer surface 55, a radially inner surface 57, and side walls 59. Side walls 59 are generally parallel for a majority of the radial length of segment 11. However, they taper inwardly, as at 61. Segment 11, as can be seen in FIG. 22, is sized and shaped to fit within gap 39 when block 5 is in its compressed position. Like segment 13, segment 11 has guides 63 and 65 formed in a top and bottom surfaces, respectively. A groove 67 is formed in bottom surface 53 and an upper groove 69 is formed on outer surface 55 to receive o-rings 21 and 19. Like guides 41 and 43 of segment 13, guide 63 extends the full radial length of top surface 51 and guide 65 extends from the radial innermost part of bottom surface 53 to bottom groove 67. When block 5 is assembled, grooves 47 and 67 form a ring in the bottom of block 5 which receives o-ring 21. Grooves 49 and 69 form a ring which receives o-ring 19.

Top 17 is shown in FIGS. 12 and 13. Top 17 is an annular ring having outer wall 71, and inner wall 73, a top surface 75, and a bottom surface 77. A plurality of evenly spaced grooves 79 are formed in bottom surface 77. Grooves 79 extend radially the full width of bottom surface 77 and receive guides 43 and 53 when block 5 is assembled. Grooves 79 operate as guide paths to control the direction of travel of segments 11 and 13. Cap 17 also has a pair of grooves 81 formed in inner surface 73 which extend axially downwardly from top surface 75. Grooves 81 are preferably semi-circular in plan and receive positioning elements of the machine (not shown) which controls the operation of blocking mechanism 1 to perform a blocking operation.

Bottom cover 9 is shown in FIGS. 14 and 15. It is generally circular in plan and has a top surface 83, a bottom surface 85, and a circumferential outer wall 87. An opening 89 is formed in the center of cover 9. Opening 89 has wall 91, shown in phantom, which tapers radially outwardly-toward top surface 83. Bottom surface 85 is counterbored as at 93 around opening 89 to form a inner step 95. A plurality of evenly spaced grooves 97 extend radially from wall 87 to step 95. Grooves 95 receive guides 43 and 65 of segments 13 and 11 when block 5 is assembled and form guide paths therefore to control the radial movement of the segments.

Expanding cone 15 is shown in FIGS. 16–18. Cone 15 is generally frustoconical, having a generally planar top surface 101 and bottom surface 103. A bore 105 extends axially through the center of cone 15. Cone 15 defines a lower portion 107 and an upper portion 109. Lower portion 107 is smooth and circular in cross. Upper portion 109 is faceted, including facets 111 and facets 113. Facets 111 and 113 are alternatively positioned about the circumference of upper portion 109. Facets 113 are slightly larger than facets 111 and have a projection 115 in the center thereof. Projection 115 extends the length of upper portion 109. A pair of blind bores 116 are formed on opposite sides of cone 15 in the upper surface 101 and receive plungers which are operated by the blocking mechanism, as is known, to force the cone axially through core 18 to expand block 5.

To assemble block 5, segments 11 and 13 are positioned in cap 17 with guides 41 and 63 being received in groove 79. o-rings 19 and 21 are then placed in their respective grooves. Bottom cover 9 is then placed over the bottom of block 5 so that its grooves 97 receive guides 43 and 63. o-rings 19 and 21 are elastomeric and biased block 5 to a normally compressed position, as shown in FIG. 22.

Figure 20A:
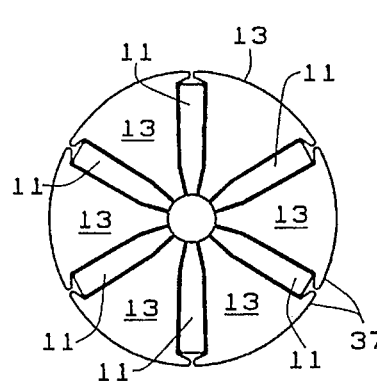
FIGS. 20A–C are top plan views of the block showing the inner diameter block in three states of expansion.
Figure 21A:
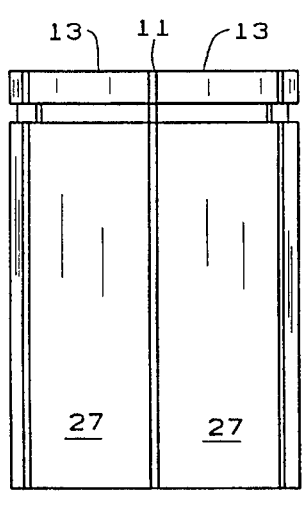
FIGS. 21A–C are side elevational view of the block showing the inner diameter block in three states of expansion.

When block 5 is in its compressed position, segment ears 37 are nearly adjacent, to substantially close gap 39 at the outer surface of block 5, as seen in FIGS. 20a and 22. This presents an outer surface which is substantially continuous, as seen in FIG. 21a. As seen in FIG. 19, segments 11 are encased in gap 39 by ears 37 and their inner surfaces 57 are positioned radially inwardly of the inner surfaces 29 of segments 13. Cone 13 is received in the bore 8 of block 5 so that projections 115 contact the inner surfaces 57 of segments 11. In the compressed position, inner surfaces 29 of segments 13 do not contact facets 111 or surface 107 of cone 15.

Figure 20B:
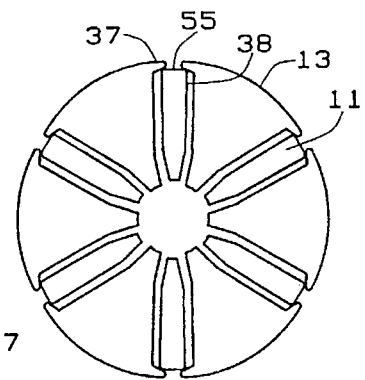
Figure 20C:
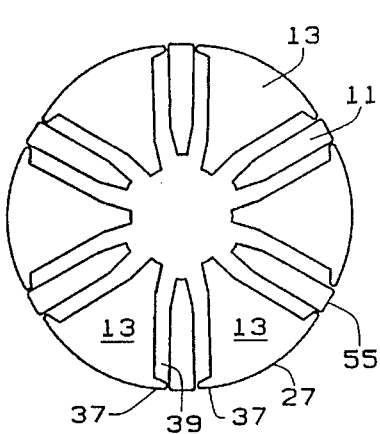
Figure 21B:
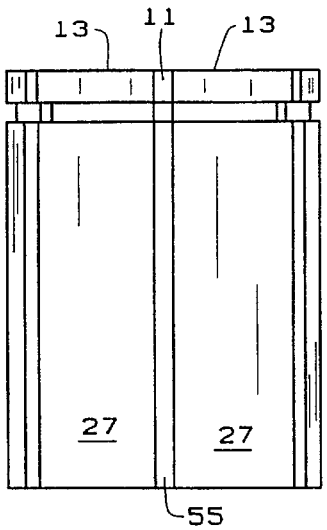
Figure 21C:
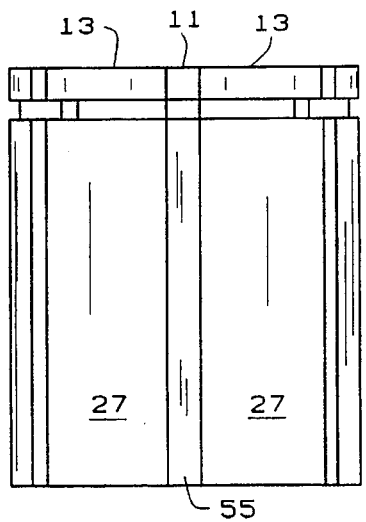

Operation of block 5 is shown in FIGS. 20A–C and 21A–C. In FIGS. 20A and 21A, block 5 is shown in its compressed condition. Segments 111 are received in gaps 39 and ears 37 are substantially adjacent each other so that the block forms a cylinder having substantially continuous gap-free outer surface, as shown in FIG. 21A. When cone 15 is urged axially downwardly through block bore 18 (as referenced in FIG. 2), projections 115 press against surface 57 of segment 11 and urge segments 11 radially outwardly. The outer surfaces 55 of segments 11 are urged against the tapered surfaces 38 of ears 37 of segments 13, causing segments 13 to move radially outwardly. As the segments 13 move radially outwardly, ears 37 separate to open gap 39. Segments 11, however close gap 39, as shown in FIGS. 20B and 21B to form a cylinder having a substantially continuous, gap-free outer surface during expansion of block 5. In its fully expanded position, shown in FIGS. 20C and 21C, segments 11 have been moved radially outwardly so that their outer walls are continuous with the outer walls 27 of segments 13. In the fully expanded, blocking position, the outer edges of ears 37 contact sides 59 of segments 11 just inside an outer surface 55, to present a cylinder having a substantially continuous, smooth, gap-free outer surface.

Figure 23:
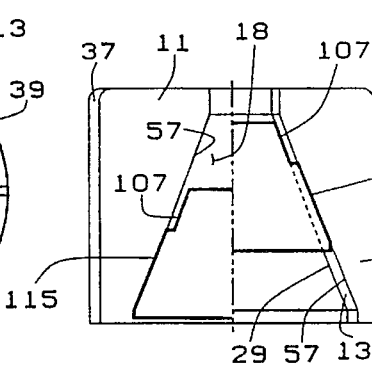
FIG. 23 is a schematic showing the cone of the block in a first compressed position and in a second expanded position.

FIG. 23 shows, in the left side, the block 5 in its compressed position, with cone projections 115 contacting surface 57 of segment 11. Cone surface 107 is not in contact with any other surface. The right half of FIG. 23 shows the block in its expanded position. The cone has been forced axially downwardly along core 18 of block 5. Projection 115 is still in contact with surface 57, but surface 107 is now in contact surface 29 of segment 13. Surface 107 contacts surface 29 when ears 37 are farthest apart, i.e., when the gap between ears 37 is equal to the width of segments 11 and when segments 11 have been urged radially outwardly to their full distance. Covers 9 and 17, by their interaction of grooves 79 and 97 with guides 41, 63, 43, and 65, guide the radial movement of segments 11 and 13.

Figure 1A:
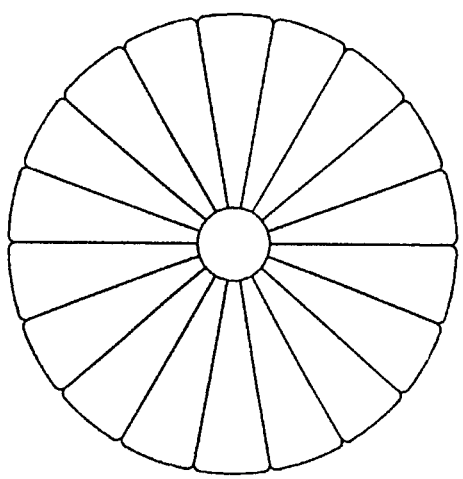
FIG. 1A is a plan view of a prior art inner diameter block tooling in a compressed position.
Figure 1B:
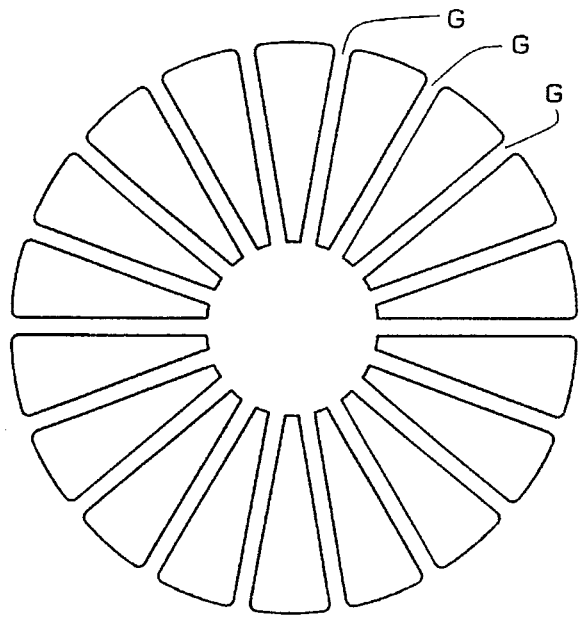
FIG. 1B is a plan view of the prior art inner diameter block in an expanded, blocking position.

In this embodiment, all the pressure of cone 15 is applied directly to segments 11. Segments 11, as they are urged radially outwardly, press against segment 13 to urge them radially outwardly. As shown in FIGS. 20A–C and 21A–C, the present invention succeeds in providing an outer surface which is substantially continuous and gap-free at all states of expansion. It therefore provides no gaps, as can be seen in the expanded prior art block of FIG. 1B, which would allow the wires to "squirt". Therefore, the present invention substantially reduces the need to overblock the inner diameter of the windings W to insure all the windings are within the desired inner diameter radius tolerances.

Figure 24:
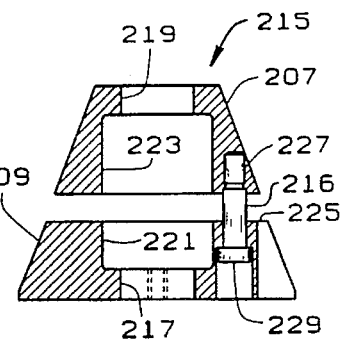
FIG. 24 is a cross sectional view of an alternative embodiment of the expanding cone.

An alternative expanding cone 215 is shown in FIG. 24. Cone 215 is used with segments 11 and 13 and covers 9 and 15. However, rather than being a single piece, it consists of a lower part 207 and an upper part 209 which are connected by a pin 216 so that they may move axially relative to each other. Parts 207 and 209 each have an axial bore 217 and 219, respectively, formed therein. Bores 217 and 219 are each counterbored at 221 and 223, respectively, to form wider inner bores. Top portion has a bore 225 and bottom portion has bore 227 formed to receive pin 215. Pin 216 has a head 229, and bore 225 is counterbored to accommodate head 229. Pin 216 is fixed to lower part 207 in bore 227. However, part 209 is free to move axially over pin 216.

Cone 215 is positioned within block core 18 with upper part 209 contacting the inner edges of segments 11. As with block 15, segments 13 are not in contact with any part of core 215 when block 5 is in the compressed position. To expand block 5, top part 209 is urged inwardly to expand segments 11, as described above. However, initially, top part 209 slides over pin 216 to move axially toward lower part 207. Pin 216 is sufficiently long to provide the travel path such that when segments 11 are fully expanded, upper part 209 will contact lower part 207. As can be seen, the use of cone 215 accomplishes the same goal and objective as the use of cone 15. Because the top part 209 of core 215 moves relative to bottom part 207, the surface of part 209 is smooth. Core 215 does not need the projections of cone 15.

The foregoing has been set forth for illustrative purposes only. Variations within the scope of the claims may be apparent to those skilled in the art.

We claim:

1. A blocking mechanism for blocking windings of a dynamoelectric machine, the windings having an inner diameter, an outer diameter, and a height; the blocking mechanism including an outer diameter block for blocking the outer diameter of the windings, an inner diameter block for blocking the inner diameter of the windings, and a compression ring for blocking the height of the windings; the inner diameter block including a plurality of radially movable segments forming an expandable cylinder which is movable between a compressed position and an expanded, blocking position, the segments of said expandable cylinder defining cylindrical a blocking surface, said blocking surface establishing an effectively continuous and gap-free surface throughout a transition between the compressed position and the expanded position, said cylindrical blocking surface moving essentially horizontally as said segments are moved between said compressed and expanded positions.

2. A blocking mechanism for blocking windings of a dynamoelectric machine, the windings having an inner diameter, an outer diameter, and a height; the blocking mechanism including:

an outer diameter block for blocking the outer diameter of the windings, an inner diameter block for blocking the inner diameter of the windings, the inner diameter block including a plurality of radially movable segments forming an expandable annular device which is movable between a compressed position and an expanded, blocking position, said expandable device having a blocking surface, said blocking surface establishing an effectively continuous and gap-free surface throughout a transition between the compressed position, and the expanded position, said blocking surface moving horizontally as said segments are moved between said compressed and expanded positions;

a compression ring for blocking the height of the windings; and a top cap and a bottom cap, at least one of said top and bottom caps having a generally planar surface defining radially extending grooves, said first and second segments having guides extending radially along at least one of their top and bottom surfaces, the guides of said first and second segments being received in the grooves of the at least one of said top and bottom cap, said grooves defining a path of travel for said segments.

3. An inner diameter block for blocking an inner diameter of windings of a dynamoelectric machine, said inner diameter block including a plurality of first radially movable segments and a plurality of second radially movable segments, said first and second segments being arranged in an alternating pattern to define an expandable cylinder which is movable between a compressed position and an expanded, blocking position, said expandable cylinder having a cylindrical blocking surface which is effectively gap-free throughout a transition between said compressed and expanded position, said segments remaining essentially positions.

4. The blocking mechanism of claim 3 wherein said segments move along a generally horizontal path of travel when said segments are moved between said compressed and expanded positions.

5. A blocking mechanism for blocking end turns of windings of a dynamoelectric machine, said dynamoelectric machine having a stator core, the core having opposed end faces, the blocking mechanism comprising:

outer diameter blocking means for blocking an outer diameter of the winding end turns along at least one end face of the core;

height blocking means for blocking a height of the winding end turns with respect to said at least one end face of the core;

inner diameter blocking means for blocking an inner diameter of the winding end turns along said at least one end face of the core, said inner diameter blocking means including a plurality of radially movable blocking segments movable between a first, non-blocking position and a second, blocking position, said segments including alternating first and second segments establishing an effectively continuous surface in at least said blocking position, said segments defining an expandable annular ring having a sloping inner surface and a generally circular outer surface; and an expansion cone mounted for axial movement with respect to the annular ring defined by said segments, said expansion cone having an outer surface adjacent said inner surface of said annular ring to force said segments radially outwardly as said expansion cone is moved axially inwardly relative to said ring to expand said ring.

6. The blocking mechanism of claim 5 wherein said cone outer surface is sloped, the slope of said cone outer surface being substantially equal to the slope of the inner surface of said expandable annular ring.

7. The blocking mechanism of claim 5 wherein when said segments are moved between said non-blocking and blocking positions, said segments travel along a path which is generally perpendicular to the axis of said stator.

8. The blocking mechanism of claim 7 wherein said outer surface of said segments are substantially parallel to the axis of said stator, said outer surface remaining substantially parallel to said stator axis as said segments are moved between said non-blocking and blocking positions.

9. In a blocking mechanism for blocking windings for an electrodynamic machine, said windings having end turns, said dynamoelectric machine including a stator having opposed end faces, the blocking mechanism having means for blocking an outer diameter of the end turns along at least one of said end faces, and means for blocking a height of the end turns with respect to said at least one end face; the improvement comprising an inner diameter blocking means for blocking an inner diameter of the end turns along said at least one end face, said inner diameter blocking means defining a generally cylindrical non-pivotal surface which is expandable radially outwardly between a first, non-blocking position and a second blocking position, said inner diameter blocking means defining a substantially continuous cylindrical surface in at least said second position.

10. The blocking mechanism of claim 9 wherein said inner diameter blocking means comprises a plurality of segments, said segments having an outer surface defining a blocking surface, said blocking surface being substantially continuous in at least said second position; said segments being movable along a path generally perpendicular to an axis of said stator.

11. In a blocking mechanism for blocking windings for an electrodynamic machine, said windings having end turns, said dynamoelectric machine including a stator having opposed end faces, the blocking mechanism having means for blocking an outer diameter of the end turns along at least one of said end faces, and means for blocking a height of the end turns with respect to said at least one end face; the improvement comprising an inner diameter blocking means for blocking an inner diameter of the end turns along said at least one end face, said inner diameter blocking means being pivotally fixed and expandable radially outwardly between a first, non-blocking position and a second blocking position, said blocking means defining a substantially continuous surface in at least said second position; said inner diameter blocking means comprising a plurality of segments, said segments having an outer surface defining a blocking surface, said blocking surface being substantially continuous in at least said second position; said segments being, movable along a path generally perpendicular to an axis of said stator, said blocking surface remaining substantially parallel to said stator axis as said segments are moved between said first and second positions.

* * * * *

UNITED STATES PATENT AND TRADEMARK OFFICE
CERTIFICATE OF CORRECTION

PATENT NO. : 5,594,984
DATED : January 21, 1997
INVENTOR(S) : Vernon E. Kieffer and J. Kliethermes It is certified that error appears in the above-indentified patent and that said Letters Patent is hereby corrected as shown below:

Claim 3, Col. 8, line 9, after the word "essentially", and before the word "positions", insert the words ---vertical as said segments are moved between said compressed and expanded---.

Signed and Sealed this

Twenty-fifth Day of November, 1997

*Attest:*

BRUCE LEHMAN

*Attesting Officer*   *Commissioner of Patents and Trademarks*